United States Patent [19]

Sormunen et al.

[11] Patent Number: 5,322,830

[45] Date of Patent: * Jun. 21, 1994

[54] METHOD FOR THE PREPARATION OF CATALYST COMPONENTS FOR THE POLYMERIZATION OF ETHYLENE WITH A RELATIVELY NARROW MOLECULAR WEIGHT DISTRIBUTION AND PROTOCATALYST COMPOSITION

[75] Inventors: Pekka Sormunen, Porvoo; Jukka Koskinen, Espoo; Päivi Waldvogel, Porvoo, all of Finland

[73] Assignee: Neste Oy, Espoo, Finland

[*] Notice: The portion of the term of this patent subsequent to Apr. 20, 2010 has been disclaimed.

[21] Appl. No.: 762,635

[22] Filed: Sep. 18, 1991

Related U.S. Application Data

[63] Continuation of Ser. No. 548,070, Jul. 5, 1990, abandoned.

[30] Foreign Application Priority Data

Jul. 28, 1989 [FI] Finland ................................. 893621

[51] Int. Cl.$^5$ ............................................... B01J 35/08
[52] U.S. Cl. .......................................... 502/9; 502/107; 502/108; 502/111; 502/125
[58] Field of Search .................... 502/9, 107, 108, 111, 502/125

[56] References Cited

U.S. PATENT DOCUMENTS

| | | | |
|---|---|---|---|
| 4,071,674 | 1/1978 | Kashiwa et al. | 502/125 |
| 4,295,991 | 10/1981 | Wristers | 502/123 |
| 4,829,034 | 5/1989 | Iiskolan et al. | 502/125 |

*Primary Examiner*—Patrick P. Garvin
*Assistant Examiner*—Brent M. Peebles

*Attorney, Agent, or Firm*—Tilton, Fallon, Lungmus & Chestnut

[57] ABSTRACT

The invention relates to a method for the preparation of a supported procatalyst intended for the polymerization of olefins, in which particles are formed from magnesium halide and alcohol, the particles are reacted with an organometallic compound of any of the metals of the groups I to III, the thus obtained particulate product is activated by means of a titanium(IV) compound, and optionally a prepolymerization is carried out for the activated particles. A problem with this kind of a method is, how to form particles from magnesium dihalide and alcohol having an advantageous structure for the polymerization of ethylene and particularly ethylene with a narrow molecular weight distribution. The problem has in the present invention been solved so that the particles are formed by spray-crystallizing a mixture of magnesium dihalide and alcohol to complex particles of magnesium dihalide and alcohol and that titanium-(IV) alcoxyhalide has been used as the titanium compound. The catalytic properties of the particles thus obtained are improved, especially after the prepolymerization carried out by means of ethylene, which leads in the polymerization to a still more active, very hydrogen and comonomer sensible procatalyst having a better molecular weight selectivity.

The invention also relates to the specific use of the procatalyst prepared by such a method for the polymerization of alpha-olefins. By a procatalyst is meant in this context the catalyst component of the Ziegler-Natta-catalyst which is based on the transition metal and which before the polymerization is combined with the organometallic compound of aluminium or some other metal acting as a cocatalyst.

16 Claims, No Drawings

METHOD FOR THE PREPARATION OF CATALYST COMPONENTS FOR THE POLYMERIZATION OF ETHYLENE WITH A RELATIVELY NARROW MOLECULAR WEIGHT DISTRIBUTION AND PROTOCATALYST COMPOSITION

This application is a continuation of application Ser. No. 07/548,070 filed Jul. 5, 1990, now abandoned.

The invention relates to a method for the preparation of a supported procatalyst intended for the polymerization of ethylene, in which particles are formed from magnesium halide and alcohol, the particles are reacted with an organometallic compound of any of the metals of the groups I to III, the thus obtained particulate product is activated by means of a titanium compound, and optionally a prepolymerization is carried out for the activated particles. The invention also relates to the specific use of the procatalyst prepared by such a method for the polymerization of alpha-olefins. By a procatalyst is meant in this context the catalyst component of a Ziegler-Natta-catalyst which is based on a transition metal and which before the polymerization is combined with an organometallic compound of aluminium or some other metal acting as a cocatalyst.

The use of Ziegler-Natta-catalysts for the polymerization of ethylene is prior known. Such catalysts comprise nowadays typically a magnesium or silica based carrier, which has been treated with a titanium halogenide compound and sometimes also with an electron donor compound. When using Mg-based carriers the carrier should be activated into a suitable crystal form in order to provide a good catalyst. This can be done by letting the carrier, $MgCl_2$, crystallize as a complex of one of its crystal solvents. Such a crystal solvent is dry, absolute ethanol, with which can be prepared the crystal complexes $MgCl_2*aEtOH$, a=1-6. By letting this kind of a crystalline complex react with an organic compound of a metal of any of the groups I to III, such as an aluminium alkyl compound $AlR_3$, the crystal solvent can be removed quantitatively so that an activated carrier $MgCl_2$ having a very large surface area and a very amorphous crystal form can be obtained.

The aluminium treatment is carried out at $-10°$ to $+30°$ C., and it lasts 30 to 180 min. The aluminium/ethanol ratio is 0.5 to 2, preferably 1.

This kind of a treatment with an alcohol and an organometallic compound has been presented e.g. in the U.S. Pat. No. 4,071,674, in which the procatalyst has been prepared by bringing the titanium or vanadinum compound to react with a reaction product that has been created when the addition product of magnesium dihalide and alcohol has reacted with an organometallic compound of a metal of any of the groups I to III. The preparation of the procatalyst takes place by adding alcohol dropwise in a suspension of magnesium dihalide, after which the organometallic compound is added to the reaction mixture dropwise. After stirring the preactivated carrier is activated by adding titanium tetrachloride into the reaction mixture. The adding stages of such a method are primitive and do not allow controlling of the morphology in the manner desired.

A similar aluminium alkyl treatment has also been described in the patent application J KTK 59-215301. In this publication the corresponding carrier complex (10 g $MgCl_2$ and 24.2 g EtOH) has been prepared by emulsion technique. The carrier melt has been dispersed in n-decane as spheroidal melt particles. Thereafter the carrier particles in the emulsion have been shock congealed by transferring the emulsion into cold hydrocarbon medium. A disadvantage of this method is among other things that in the preparation of the carrier components are needed that are of no advantage at later stages of the preparation of the catalyst and this presupposes existance of refining and recirculation equipment.

Furthermore, an advantage in the use of a crystal solvent is that it makes the control of the morphology of the carrier possible. According to the patent application FI-862469 (Neste Oy) the above-mentioned carrier complex can be melted to a clear liquid. By conducting such a liquid through a spray-nozzle into a spray-chamber cooled by cold nitrogen gas it crystallizes to small particles having a spherical carrier complex, which are very flowing and loose. Furthermore, the carrier complex crystallizes without evaporation of crystal solvent. Hereby a nacreous non-porous surface is achieved, which is particularly preferable for the preparation of an active catalyst.

When such an activated carrier is conducted into contact with titanium compounds, catalytically active complexes are formed between the $MgCl_2$ and the titanium compound on the surface of the carrier.

The above-mentioned catalysts according to the prior art are in spite of their drawbacks usable common polymerization catalysts for olefins. Now we have noted that when using alcoxychloride compounds of titanium and preferably a prepolymerization stage carried out by means of ethylene even higher activities may be achieved than with titanium tetrachloride. Moreover, a good hydrogen sensibility and above all a good comonomer sensibility is achieved. Hereby the usability of the catalyst, particularly for several-stage polymerizations, is improved.

Ziegler-Natta-catalysts have been modified in other connections by using titanium alcoxyhalide compounds as the titanium compound trying to affect by these compounds the properties of the catalyst. Accordingly, examples are known in the patent litterature of the use of titanium(IV)alcoxyhalide compounds of the form $Ti(OR)_xCl_{4-x}$.

$Et_2AlCl$ together with $Ti(OR)_nCl_4$ produces polyethylene (Polimery, Warsaw, 29 (10-11-12) 411–414, 1984).

Tactic polypropylene with a low molecular weight has been prepared by using $EtOTiCl_3$ as catalyst and $Et_2AlCl$ as cocatalyst (Ger.Offen. DE-1,946,672).

By using $MgCl_2$-ethylenebenzoate as the carrier propylene has been polymerized with $Ti(OR)_nCl_{4-n}$-compounds; the best result has been obtained with n-hexyloxytitanium trichloride (Gaofenzi Tongxun, (1) 38–42).

In the publication Braz. Pedido PI BR 79/7531 (24 Jun. 1980) 10 g of $MgCl_2$ has been suspended with 200 ml of heptane and 620 mg of $Cl_3TiOEt$ has been added to the mixture. This has then been treated with 1 ml of $TiCl_4$. The polymerization of ethylene by using TEA as a cocatalyst gave 2840 g of polyethylene/g of catalyst-hour-atm of ethylene as the polymerization activity. In this example notable is that the synthesis includes the aftertreatment with $TiCl_4$, of which there is a larger quantity than $Ti(OEt)Cl_3$. Moreover, the morphology of the carrier has not been controlled.

GB 1,546,912 describes a catalyst system in which $MgCl_2$ and titanium trichloride methoxide are ground together whereby a titanium content of 5.3% was obtained for the catalyst. This was used as the polymerization catalyst of ethylene together with the reaction product of triethylene-aluminium and BHT (2.6-ditert.-buthylparacresoline).

U.S. Pat. No. 4,721,763 describes a catalyst system, in which the Mg-alkyl compound is treated with diethylaluminium chloride and t-buthylchloride in an ether solution, after which di-n-propoxytitanium dichloride is reacted on this precipitate, after which the catalyst system is still prepolymerated in two stages before the gas phase polymerization. Both the preparation stage of the carrier and the prepolymerization stage of the procatalyst are laborous and do not guarantee a suitable catalyst morphology.

The drawback of the above-mentioned publications, in which titanium (IV) alcoxyhalide compounds have been used, is that no crystal solvent or organometallic compound improving the morphology has been used in them and neither a morphologically preferable solidifying technique, such as emulsion- or spray-crystallization.

An object of the present invention is to provide a new Ziegler-Natta-catalyst and a method for preparing it by means of which large amounts of polyethylene and particularly polyethylene with a narrow molecular weight distribution can be prepared. The invention is mainly characterized by the features mentioned in the characterizing clause of the independent patent claim.

Accordingly, it has been realized that a suitable procatalyst can be provided by a method in which a) particles are formed of magnesium dihalide and alcohol, b) the particles are reacted with an organometallic compound of a metal of any of the groups I to III, c) the particulate product obtained from the stage b) is activated by means of a specific titanium compound, and d) optionally a prepolymerization is carried out for the activated particles.

In the method a) the carrier particles are formed by spray-crystallizing a mixture of magnesium dihalide and alcohol to crystalline complex particles of magnesium dihalide and alcohol, for which the stages b), c), and d) of the method are then carried out and that titanium (IV)alcoxyhalide compounds according to the formula

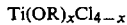

Ti(OR)$_x$Cl$_{4-x}$ in which x=1, 2, or 3 and R is a hydrocarbon group containing 1 to 8 carbon atoms, are used as the specific titanium compound. The method is based on the idea that an addition product formed by magnesium dihalide and alcohol must contain a great amount of hydroxyl groups in order that its preactivation according to stage b) would succeed. A hydroxyl amount great enough and a satisfactory morphology can be provided only by spray-crystallization. Moreover, it has been noted that titanium(IV)alcoxyhalide is better suitable than other titanium(IV)-compounds for the preparation of polyethylene and particularly of polyethylene with a narrow molecular weight distribution.

A result of the narrow molecular weight distribution of polyethylene prepared by means of a procatalyst is, furthermore, that the procatalyst according to the invention is particularly suitable for multistage-, preferably double-stage-polymerization of polyethylene with a specific weight distribution, in the various stages of which various concentrations of hydrogen regulating the molecular weight are used.

According to the present invention the magnesium dihalide carrier should first be activated to a suitable crystal form by letting it complex with the crystal solvent. This takes place by forming the particles by spray-crystallizing a mixture of magnesium dihalide and alcohol to crystalline complex particles of magnesium dihalide and alcohol. The spray-crystallization is preferably carried out by heating the magnesium dihalide solvated with alcohol to a homogeneous liquid and by spraying thereafter the liquid by means of hot spray gas into a cooled spray chamber, in which carrier complex particles of magnesium dihalide and alcohol are formed without substantial evaporation of the alcohol. The spray crystallization is carried out by using gases, such as dry nitrogen, which are inert with respect to the reaction components.

The magnesium dihalide shall be anhydrous and dry. The most preferable magnesium dihalide is magnesium dichloride. Alcohols have been noted to be preferable crystal solvents, dry (anhydrous) absolute ethanol as the most preferable one. Ethanol forms a crystalline complex MgCl$_2$ x aEtOH, in which a is 1-6, preferably 2-6, and most preferably 3, with magnesium dichloride. Then the carrier complex is melted and sprayed into cold inert gas whereby it crystallizes without evaporation of the crystal solvent. Accordingly, this spray-crystallization of the carrier takes place by substantially similar method as that presented in our patent application FI-862459.

In the spray-crystallization the injection of the melt complex takes place into cooled gas, so substantial transfer of substance, i.e. evaporation, does not take place in the process and the solidifying melt crystallizes in the spraying to its original consistency.

In the following stage the spray-crystallized complex of magnesium dihalide and alcohol is reacted in the form of particles with an organometallic compound of a metal of any of the groups I to III of the periodical table of the elements. An organometallic compound is e.g. the compound according to the formula RM, in which R is an alkyl or an aryl group and M is lithium, sodium or potassium, a compound according to the formula R$_2$M', in which R is the same as before and M' is zinc or cadmium, a compound according to the formula R$_{2-l}$MgX$_l$, in which R is the same as described above, X is a halogen atom and l is 0 or 1, a compound according to the formula MAlR$_4$, in which R and M are the same as before, compounds according to the formula R'$_{3-m}$AlX$_m$, in which R' is a hydrogen atom, an alkyl group or an aryl group, X is the same as before and m is 0 or a positive number lower than 3, compounds according to the formula R'$_{3-n}$Al(OR)$_n$, in which R' and R are the same as before and n is a positive number greater than 0 but smaller than 3, or the compounds according to the formula RAl(OR)X, in which R and X also are the same as defined above. R and R' are preferably alkyl groups containing 1-12 carbon atoms, phenyl groups or benzyl groups and X is chlorine or bromium, preferably chlorine. Most preferable are the organoaluminium compounds having the formula R'$_{3-m}$AlX$_3$, e.g. (C$_2$H$_5$)$_3$Al.

The treatment with organometallic compound takes place simply by bringing the catalyst complex particles prepared by spray-crystallizing into contact with an organometallic compound, such as an aluminium alkyl. The treatment is preferably carried out at a temperature of −10° to +30° C. and it preferably takes from about 30 to 180 minutes. For promoting the reaction additional heating can be used. The aluminium/ethanol ratio is preferably 0.5 to 2, most preferably about 1. The treatment leads to a substantially quantitative removal of the crystal solvent i.e. the alcohol and the result is a preactivated amorphous carrier with a very great surface area.

The actual activation of the preheated complex particles takes place by means of a titanium(IV) compound. The preactivated carrier is brought into contact with said titanium(IV) compound, whereby catalytically active complexes are formed between the magnesium dihalide, such as magnesium dichloride, and the titanium(IV) alcoxy halide.

The titanium compounds are titanium(IV) alcoxy halide compounds, particularly compounds of the form (I) $Ti(OR)_xCl_{4-x}$, in which $X=1$, 2, or 3, and R is an alkyl group containing 1 to 8 carbon atoms.

Particularly preferable are $Ti(OEt)Cl_3$, $Ti(OPr-i)Cl_3$, $Ti(OBu-n)Cl_3$ and $Ti(OPr-i)_2Cl_2$. A difference in regard to the use of $TiCl_4$ is the selectivity of the these chlorine alcoxy compounds: they are not, like $TiCl_4$, active alone in regard to other monomers, such as for the homopolymerization of e.g. propylene. For the homo- or copolymerization of ethylene they are, on the other hand, even better than $TiCl_4$. The activation i.e. the titanium treatment is carried out at 30° to 110° C. and it lasts about 30 to 180 minutes.

The result is a very utilizable procatalyst as to its morphology and chemical structure, which is suitable for the polymerization of ethylene and particularly for the preparation of polyethylene with a narrow molecular weight.

Alternatively, the procatalyst can still be improved by prepolymerizing one or several suitable alpha-olefins on its surface. Hereby are achieved, among other things, the advantages that the start of the polymerization is more controlled and that the mechanical endurability of the catalyst particles is improved, whereby the feeding ability into the polymerization process is improved.

It is preferable to carry out the prepolymerization directly in the preparation stage of the catalyst, whereby extra transfer and treatment stages, which can weaken the capacity of the catalyst, are avoided. The most preferable monomer is ethylene.

Before prepolymerization the procatalyst is preferably treated with an organometallic cocatalyst. Preferable cocatalysts are of the form $R_mAlX_{3-m}$, in which R is an alkyl-, cycloalkyl-, or aryl-group having 1 to 10 carbon atoms, X is an halogen atom, e.g. Cl or Br, and m is 0, 1, 2, or 3. Also the compounds according to the formula $Al_2R_3X_3$ come into question, in which R is the same as before. Trimethylaluminium, triethylaluminium, tri-isopropylaluminium, tri-isobuthylaluminium, trioctylaluminium, diethylaluminium chloride, di-isopropylaluminium chloride, di-isobuthylaluminium chloride, dioctylaluminium chloride, alkylaluminium sesquihalides, etc., can be mentioned as suitable aluminium compounds.

The prepolymerization is carried out as any prepolymerization of Ziegler-Natta-catalyst particles known in the field, e.g. by bubbling ethylene into catalyst reactor. A preferable aluminium/titanium ratio is hereby 1 to 50, still more preferable 1 to 10, and the aluminium/donor ratio is preferably about 1 to 10, still more preferably 1 to 5. The monomer/titanium ratio is about 10 to 200, preferably about 10 to 40. The polymerization is carried out at normal pressure, the temperature is 10° to 30° C. and it lasts about 15 to 120 minutes, preferably about 15 to 30 minutes. The following advantages are achieved, among others, by the prepolymerization: the start of the polymerization is more controlled and the mechanical stability of the catalyst particles improves, whereby the feeding capability of the catalyst into the polymerization processes is improved. Moreover, particularly when prepolymerizing with ethylene, the activity of the catalyst (counted as per gram of titanium) can increase as 2 to 3fold.

The invention is illustrated in the following by examples.

Preparation of a Carrier

A spray-crystallized, spheroidal $MgCl_2*3EtOH$-carrier was prepared according to the patent application FI-862459 (Neste Oy) as follows:

Into a nitrogen treated autoclave of 110 liters was dosed 35 kg of dry $MgCl_2$ and 65 liters of dry ethanol. This reaction mixture was melted at 110° C. under agitation at the end. After an agitation of 2 hours a clear homogenized mixture was fed at a rate of 10 kg/h into a cooled spray-chamber, into which was led nitrogen of the temperature $-20°$ C. as a cooling medium. The nozzle type was a 9 mm gas-liquid-fluidizising nozzle, in which the feed opening of the melt was 1.0 mm in diameter and the spraying angle 60°. Dried nitrogen of the temperature $+130°$ C. was used as spraying gas at the feed rate of 40 kg/h.

The product was freely flowable and of a spheroidal form and it escaped at the temperature of about 0° C.

EXAMPLE 1

A. Preactivation of the Carrier 5 g of the above-mentioned carrier complex $MgCl2*EtOH$ (65 mmol EtOH) was weighed into a 250 ml reactor furnished with a mixer, a reflux cooler, a thermometer and a nitrogen lock. 30 ml of pentane dried on molecular sieves was added. The mixture was cooled to $-10°$ C. and to the reactor was dropped from a dropping funnel 10% by weight triethylaluminium solution 114 ml (80 mmol TEA) having pentane as solvent.

The temperature was raised to the boiling point of pentane $+36°$ C. and was maintained in it for one hour.

The activated carrier was washed 5 times with 30 ml of pentane at room temperature and was left in the final washing solution.

B. Activation of Carrier by Titanium (IV) Compound

To the carrier solution was added 0.5 g of $Ti(OEt)Cl_3$ dissolved in 50 ml of heptane. The mixture was agitated for 4 hours at 40° C. and washed 3 times with 200 ml of heptane and once with pentane.

4.6 g of catalyst component was obtained having the following composition: Mg 14.9%, Ti 5.1% and Cl 56.6%.

EXAMPLE 2

Prepolymerization 500 mg of catalyst component 1B was weighed in a septum bottle, pentane and 4.3 ml of a 10% by weight TEA solution in pentane (Al/Ti=5) was added. Agitation took 10 minutes. Then ethylene was conducted at normal pressure by bubbling through the solution for about 3 minutes at room temperature. The mixture was washed 2 times with pentane and dried with nitrogen.

The yield was 850 mg. The titanium content of the catalyst was 2.6%.

EXAMPLE 3

5 g of sprayed carrier treated with aluminium alkyl was precipitated in 40 ml of heptane and 1 g of TiCl$_3$(OBu-n) was added, the mixture was agitated at 45° C. for 3 hours and washed with heptane. The catalyst component 3 was dried with nitrogen, the yield was 4.5 g. 3 contains Mg 13.0%, Ti 3.4%, and Cl 38.3%.

EXAMPLE 4

Prepolymerization 500 mg of catalyst component 3 was precipitated in 100 ml of pentane, to which 2.9 ml 10% TEA (Al/Ti=5) was added, agitation took place at room temperature for 10 minutes. After that ethylene was bubbled into the solution for 2 minutes. In this way 950 mg of catalyst component 4 was obtained having a titanium content 1.6%.

EXAMPLE 5

As example 3, but instead of Ti(OBu-n)Cl$_3$ Ti(OPr-i)Cl$_3$ was used. In this way 4.5 g of catalyst component 5 was obtained having a titanium content of 7.1%.

EXAMPLE 6

As in example 1, but instead of Ti(OEt)Cl$_3$ Ti(OPr-i)$_2$Cl$_2$ was used.
4.5 g of catalyst component 6 was obtained; Ti 4.0%, Mg 17.0% and Cl 48.5%.

EXAMPLE 7

Prepolymerization

The catalyst component 6 was prepolymerized in the way described in example 2, the yield was 900 mg and the titanium content 1.7%.

Polymerization Method

1. Test Polymerization of Ethylene

To a 3 liter reactor was added 2 liters of pentane purified with active aluminium oxide and molecular sieves. 20 to 100 mg of catalyst was fed from a feed ampoule dissolved in a small amount of pentane and the temperature was raised to 80° C. As a cocatalyst was used 5 ml of triethylaluminium as a 10% by weight solution.

Hydrogen was pressurized to 5 bars in a vessel of 0.5 liter, from where it was conducted together with the aluminium alkyl and ethylene to the reactor. The total pressure was increased by means of ethylene to 15 bars, the temperature was raised to 90° C. and the polymerization was continued for 60 to 90 minutes. During the polymerization ethylene gas was added to maintain the pressure constant.

2-Stage Polymerization 2-stage polymerization: 1. stage: hydrogen was added at a temperature of 24° C. directly to the reactor, whereby the pressure rose to 8.2 bars. The temperature was raised to 80° C., whereby the pressure was 12.3 bars. The polymerization was started by adding ethylene and the temperature was raised to 90° C.; the total pressure was 15.3 bars. The polymerization was continued for 45 minutes, cooling to 22° C., the reactor was depressurized and washed with nitrogen. Stage 2 was started by increasing the temperature to 50° C., whereby the pressure in the reactor was 1.6 bars, and ethylene was added so that the total pressure was 5.8 bars. Polymerization was continued for 12 minutes. The GPC-analyses of the polymer obtained gave Mw 420,000 as the molecular weight and D=68 as the polydispersity.

| Example | CAT mg | PE g | ACT a) | ACT b) | MI (21,6) | MI (2,16) | MFR | Density |
|---|---|---|---|---|---|---|---|---|
| 1 | 30 | 751 | 16 698 | 491 000 | 37,3 | 1,28 | 29,1 | |
| 2 c) | 24 | 598 | 24 917 | 958 000 | 40,9 | 1,38 | 29,6 | |
| 2 | 20 | 353 | 17 650 | 679 000 | 80,5 | 2,79 | 28,8 | 0,940 |
| 2 d) | 102 | 164 | — | — | 4,45 | 0,03 | 130 | |
| 3 | 33 | 536 | 16 242 | 478 000 | 55,0 | 1,98 | 27,8 | |
| 4 | 24 | 332 | 13 833 | 865 000 | 15,8 | 0,53 | 29,7 | |
| 5 | 30 | 146 | 4 867 | | 5,2 | 0,22 | 23,8 | |
| 6 | 30 | 454 | 15 133 | 378 000 | 41,9 | 1,59 | 26,4 | |
| 7 | 27 | 484 | 17 926 | 1054 000 | 16,0 | 0,51 | 31,2 | | a) gPE/g cat.h
b) gPE/g Ti.h
c) copolymerization
d) 2-stage polymerization
MI = melt index
MFR = melt flow ratio The following advantages were achieved by the invention:

A simple, stoichiometric method of preparation, a very high polymerization activity of the ethylenes, a good comonomer sensibility, suitable also for 2-stage polymerization, a narrow molecular weight distribution of the polyethylene product, a good morphology thanks to the spray-crystallization, the activity of the catalyst and the mechanical stability improve through the prepolymerization.

We claim:

1. A method for the preparation of a supported procatalyst intended for the polymerization of ethylene comprising:
   (a) spray-crystallizing a mixture of magnesium dihalide and alcohol to obtain crystalline complex particles of magnesium dihalide and alcohol;
   (b) reacting said complex with alkyl or aryl compound of metal of groups I or II, and
   (c) activating said reacted complex with titanium (IV) alcoxyhalide compound having the formula: Ti(OR)$_x$Cl$_{4-x}$ in which x=1,2, or 3, and R is hydrocarbon group containing 1 to 8 carbon atoms.

2. The method according to claim 1 in which the alcoxyhalide compound is selected from the group consisting of Ti(OEt)Cl$_3$, Ti(OPri)Cl$_3$, Ti(OBu-n)Cl$_3$, and Ti(OPri)$_2$Cl$_2$.

3. The method according to claims 1 or 2 in which said spray-crystallization is carried out by heating the magnesium dihalide solvated by alcohol to a homogeneous liquid, and spraying the liquid by means of hot spray gas into cooled spray chamber, whereby complex particles of the magnesium dihalide and the alcohol are formed without substantial evaporation of the alcohol.

4. The method according to claims 1 or 2 in which the magnesium dihalide is magnesium dichloride.

5. The method according to claims 1 or 2 in which the alcohol is an aliphatic alcohol.

6. The method according to claims 1 or 2 in which the alcohol is essentially dry ethanol.

7. The method according to claims 1 or 2 in which the alkyl or aryl compound of the metal is a trialkylaluminium compound.

8. A method for the preparation of an ethylene prepolymerized supported procatalyst intended for the polymerization of ethylene comprising:
   (a) spray-crystallizing a mixture of magnesium dihalide and alcohol to obtain crystalline complex particles of magnesium dihalide and alcohol;
   (b) reacting said complex with alkyl or aryl compound of metal of groups I or II, and
   (c) activating said reacted complex with titanium (IV) alcoxyhalide compound having the formula: Ti(OR)$_x$ Cl$_{4-x}$ in which x=1, 2, or 3 and R is a hydrocarbon group containing 1 to 8 carbon atoms;
   (d) prepolymerizing said activated reacted complex.

9. The method according to claim 8 in which the alcoxyhalide compound is selected from the group consisting of Ti(OEt)Cl$_3$, Ti(OPri)Cl$_3$, Ti(OBu-n)Cl$_3$, and Ti(OPri)$_2$Cl$_2$.

10. The method according to claims 8 or 9 in which said spray-crystallization is carried out by heating the magnesium dihalide solvated by alcohol to a homogeneous liquid, and spraying the liquid by means of hot spray gas into cooled spray chamber, whereby complex particles of the magnesium dihalide and the alcohol are formed without substantial evaporation of the alcohol.

11. The method according to claims 8 or 9 in which the magnesium dihalide is magnesium dichloride.

12. The method according to claims 8 or 9 in which the alcohol is an aliphatic alcohol.

13. The method according to claims 8 or 9 in which the alcohol is essentially dry ethanol.

14. The method according to claims 8 or 9 in which the alkyl or aryl compound of the metal is a trialkylaluminium compound.

15. A supported procatalyst made by the process comprising:
   (a) spray-crystallizing a mixture of magnesium dihalide and alcohol to obtain crystalline complex particles of magnesium dihalide and alcohol;
   (b) reacting said complex with alkyl or aryl compound of metal of the groups I or II, and
   (c) activating said reacted complex with titanium (IV) alcoxyhalide compound having the formula: Ti(OR)$_x$ Cl$_{4-x}$ in which x=1, 2, or 3 and R is a hydrocarbon group containing 1 to 8 carbon atoms.

16. A supported ethylene prepolymerized procatalyst made by the process comprising:
   (a) spray-crystallizing a mixture of magnesium dihalide and alcohol to obtain crystalline complex particles of magnesium dihalide and alcohol;
   (b) reacting said complex with alkyl or aryl compound of metal of groups I or II, and
   (c) activating said reacted complex with titanium (IV) alcoxyhalide compound having the formula: Ti(OR)$_x$ Cl$_{4-x}$ in which x=1, 2, or 3 and R is a hydrocarbon group containing 1 to 8 carbon atoms;
   (d) prepolymerizing with ethylene.

* * * * *